(12) United States Patent
Shinoda et al.

(10) Patent No.: US 8,891,237 B2
(45) Date of Patent: Nov. 18, 2014

(54) WATER-RESISTANT COVER AND ELECTRONIC DEVICE

(75) Inventors: Takao Shinoda, Kawasaki (JP); Shingo Yamaguchi, Kawasaki (JP); Kohei Choraku, Kawasaki (JP); Takeshi Komuro, Kawasaki (JP); Manabu Hongo, Kawasaki (JP); Hiroaki Sakashita, Kawasaki (JP); Hidekatsu Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 13/155,001

(22) Filed: Jun. 7, 2011

(65) Prior Publication Data

US 2012/0055838 A1 Mar. 8, 2012

(30) Foreign Application Priority Data

Sep. 8, 2010 (JP) ................................. 2010-201350

(51) Int. Cl.
*G06F 1/16* (2006.01)
*H04M 1/02* (2006.01)
*H04M 1/18* (2006.01)

(52) U.S. Cl.
CPC .............. *H04M 1/0262* (2013.01); *H04M 1/18* (2013.01)
USPC ...................... 361/679.56; 429/96; 455/575.8

(58) Field of Classification Search
None
See application file for complete search history.

(56) References Cited

U.S. PATENT DOCUMENTS

| | | | | |
|---|---|---|---|---|
| 7,700,223 B2* | 4/2010 | Ge et al. | ............................ | 429/97 |
| 7,854,434 B2* | 12/2010 | Heiman et al. | ................. | 277/644 |
| 7,925,316 B2* | 4/2011 | Hongo et al. | .............. | 455/575.3 |
| 8,073,508 B2* | 12/2011 | Park et al. | ................... | 455/575.4 |
| 2004/0089570 A1* | 5/2004 | Chien et al. | ..................... | 206/320 |
| 2004/0121226 A1* | 6/2004 | Kaelin et al. | ...................... | 429/96 |
| 2004/0195783 A1* | 10/2004 | Akagi et al. | ................... | 277/645 |
| 2005/0088809 A1* | 4/2005 | Nakagawa et al. | ............ | 361/681 |
| 2006/0121338 A1* | 6/2006 | Ge et al. | ........................... | 429/97 |
| 2007/0006421 A1 | 1/2007 | Park et al. | | |
| 2009/0117957 A1* | 5/2009 | Araki et al. | .................. | 455/575.8 |
| 2009/0215412 A1* | 8/2009 | Liu et al. | ....................... | 455/90.3 |

(Continued)

FOREIGN PATENT DOCUMENTS

CN 2457807 Y 10/2001
CN 1893460 A 1/2007

(Continued)

OTHER PUBLICATIONS

Chinese Office Action dated Oct. 31, 2013, issued in corresponding Chinese Patent Application No. 201110171184.4 with English translation (18 pages).
Japanese Office Action dated Dec. 10, 2013, issued in corresponding Japanese Patent Application No. 2010-201350 with English translation (5 pages).

(Continued)

*Primary Examiner* — Adrian S Wilson
(74) *Attorney, Agent, or Firm* — Westerman, Hattori, Daniels & Adrian, LLP

(57) ABSTRACT

A water-resistant cover placed on an electronic device in an attachable/removable manner, and for the water-resistant cover and the circumference of a water-resistant area of the electronic device, a sealing member is provided on the whole circumference in the circumference direction of the water-resistant area on one side, and a contact plane facing the sealing member is formed on the same plane on another side, and the water-resistant cover slides and put on the electronic device in the state in which the sealing member contacts the contact plane and pressed.

11 Claims, 17 Drawing Sheets

(56) References Cited

U.S. PATENT DOCUMENTS

| | | | |
|---|---|---|---|
| 2009/0260844 A1* | 10/2009 | Tseng | 174/50.5 |
| 2009/0291709 A1* | 11/2009 | Lee et al. | 455/556.2 |
| 2010/0206601 A1* | 8/2010 | Choraku et al. | 174/50.5 |
| 2011/0051348 A1* | 3/2011 | Song | 361/679.26 |

FOREIGN PATENT DOCUMENTS

| | | | | |
|---|---|---|---|---|
| JP | 09075208 A | * | 3/1997 | A47J 27/00 |
| JP | 11-025940 A | | 1/1999 | |
| JP | 2004296957 A | * | 10/2004 | H05K 5/02 |
| JP | 2007-157779 A | | 6/2007 | |
| JP | 2007312255 A | * | 11/2007 | |
| JP | 2008288174 A | * | 11/2008 | |
| JP | 4424445 B1 | | 3/2010 | |

OTHER PUBLICATIONS

Office Action dated Mar. 28, 2014, issued in corresponding Chinese Patent Application No. 201110171184.4 with English Translation (14 pages).

With an English translation of Chinese Office Action dated Sep. 10, 2014, issued in corresponding Chinese Patent Application No. 201110171184.4 (17 pages).

* cited by examiner

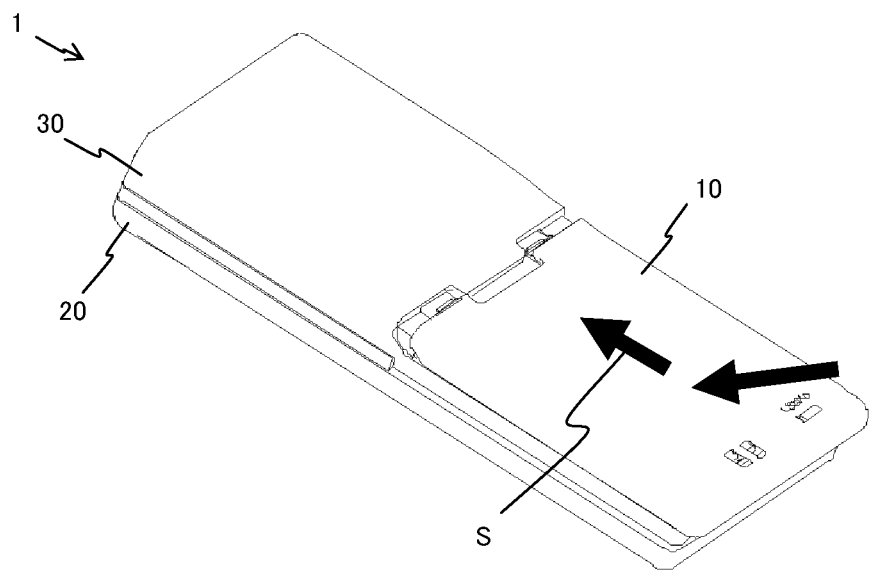
F I G. 1

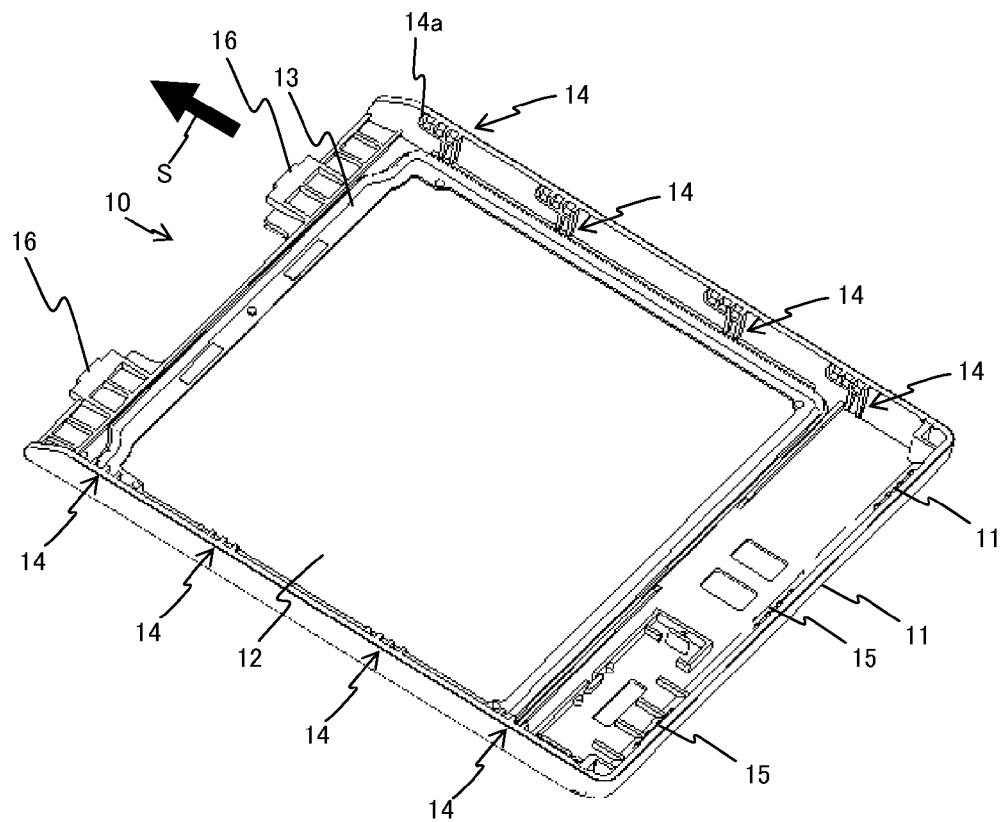
F I G. 3

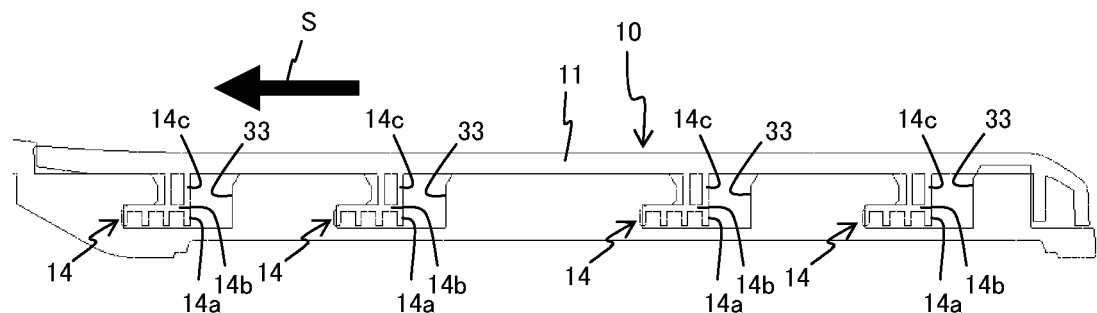
F I G. 8 B

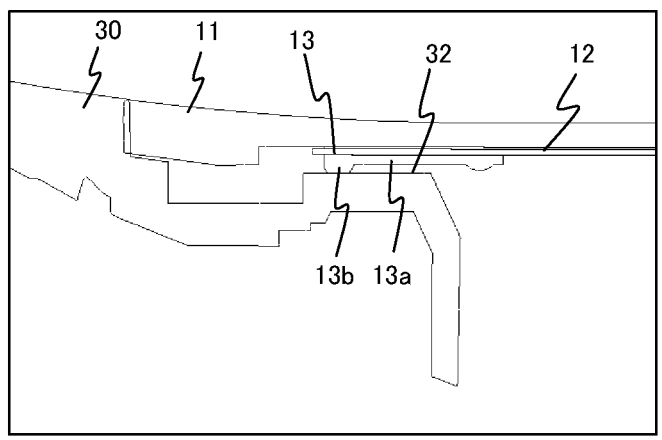
F I G. 8 C

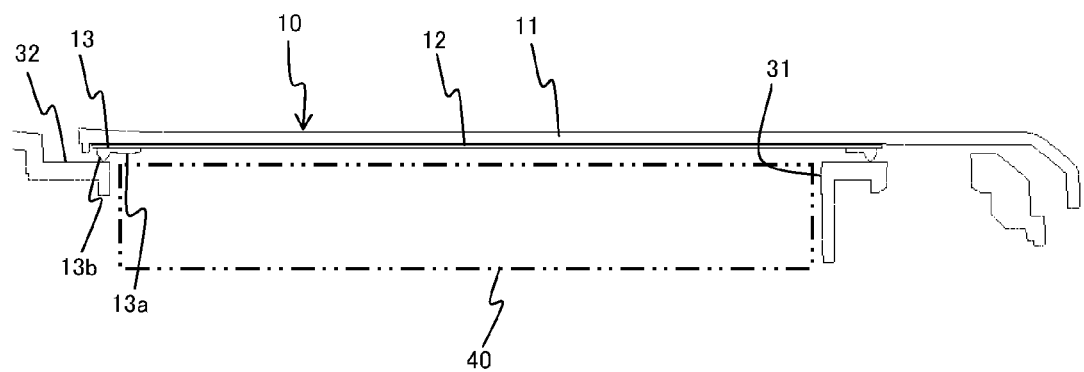
F I G. 9 A

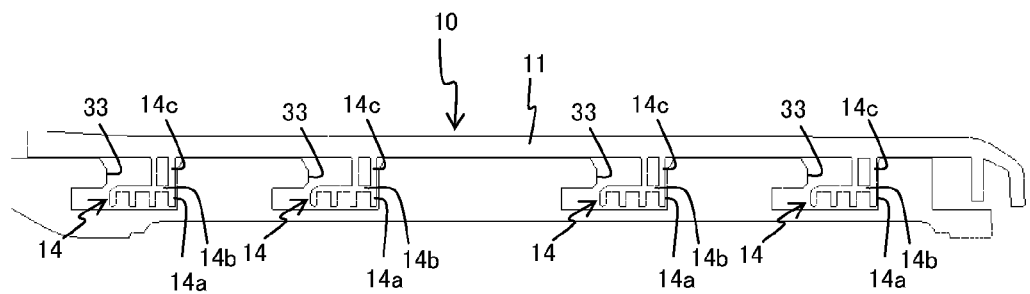
F I G. 9 B

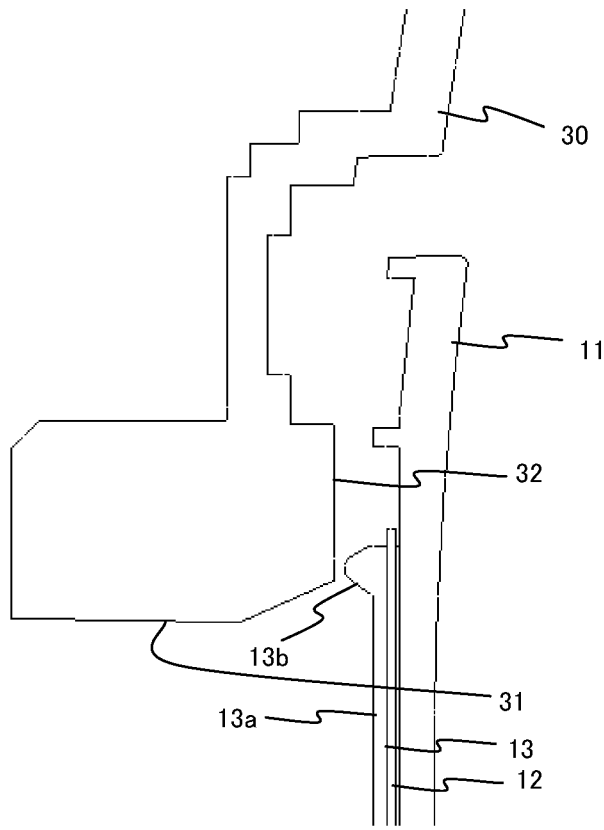
F I G. 1 0 A

WATER-RESISTANT COVER AND ELECTRONIC DEVICE

CROSS-REFERENCE TO RELATED APPLICATIONS

This application is based upon and claims the benefit of priority of the prior Japanese Patent Application No. 2010-201350 filed on Sep. 8, 2010, the entire contents of which are incorporated herein by reference.

FIELD

The embodiment described herein are related to a water-resistance cover that is placed in an electronics device in an attachable/removable manner, and an electronic device having the water-resistant cover.

BACKGROUND

Conventionally, a waterproof gasket has been used in a water-resistant area in an electronic device such as a mobile phone. As the waterproof gasket, a waterproof gasket that is press both sides in the width direction of the electronic device has been known.

In addition, a waterproof gasket that is pressed by a rib of a battery lid has been known.

Patent Document 1: Japanese Laid-open Patent Publication No. 11-25940

Patent Document 2: Japanese Patent No. 4424445

SUMMARY

The water-resistant cover is a water-resistant cover placed on an electronic device in an attachable/removable manner. For the water-resistant cover and the circumference of a water-resistant area of the electronic device, a sealing member is provided on the whole circumference in the circumferential direction of the water-resistant area on one side, and a contact plane facing the sealing member is formed on the same plane on another side. The water-resistant cover slides and put on the electronic device in a state in which the sealing member contacts the contact plane and pressed.

An electronics device disclosed herein has the water-resistance cover described above and the water-resistance area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an oblique perspective view illustrating a mobile phone having a water-resistant cover.

FIG. 3 is an oblique perspective view of a water-resistant cover from inside.

FIG. 8B is a sectional view (part 2) illustrating a water-resistant cover after sliding.

FIG. 8C is a diagram in which part A in FIG. 8A is enlarged.

FIG. 9A is a sectional view (part 1) illustrating a water-resistant cover before sliding.

FIG. 9B is a sectional view (part 2) illustrating a water-resistant cover before sliding.

FIG. 10A is a sectional diagram illustrating a sealing member before contact.

DESCRIPTION OF EMBODIMENTS

By the way, for the water-resistant cover, for the one in which the waterproof gasket is pressed in the width direction of an electronic device, thickness of the wall that has enough endurance for pressing on the gasket is required, increasing the size in the width direction, Meanwhile, for a water-resistant cover in which the waterproof gasket is pressed by a rib and the like, for example, the size in the thickness direction becomes large.

Furthermore, when the water-resistant area is the battery storage unit, it has been difficult to increase the size in the width direction for example of an electronic due to recent increase in battery capacity, while maintaining the size of the electronic device for the convenience to handle the electronic device.

Hereinafter, a water-resistant cover and an electronic device according to an embodiment is described with reference to drawings.

FIG. 1 is an oblique perspective view illustrating a mobile phone 1 having a water-resistant cover 10.

Figure 2:
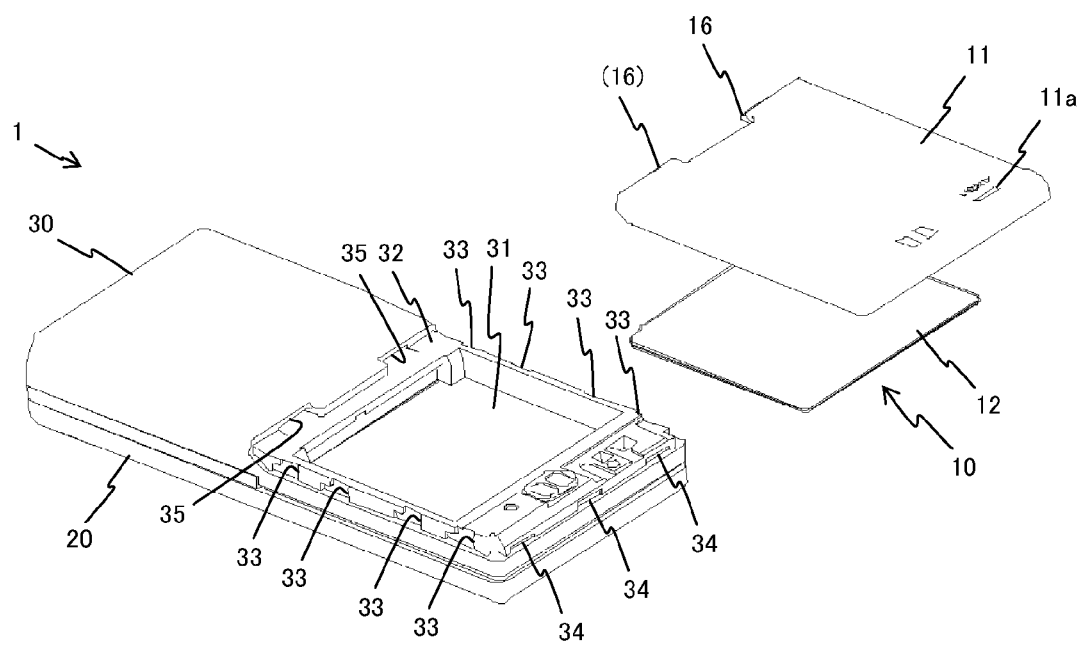
FIG. 2 is an oblique perspective view illustrating a mobile phone with a plane plate of a water-resistant cover being broken down.

FIG. 2 is an oblique perspective view illustrating the mobile phone 1 with a plane plate 12 of the water-resistant cover 10 being broken down.

FIG. 3 is an oblique perspective view of the water-resistant cover from inside.

As illustrated in FIG. 1 and FIG. 2, the mobile phone 1 has the water-resistant cover 10, a front-side casing 20 and a back-side casing 30 that are connected to each other by hinge connection. The mobile phone 1 is an example of an electronic device.

The water-resistant cover 10 is placed on the mobile phone 10 in an attachable/removable manner so as to cover a battery storage unit 31. In the battery storage unit 31, a battery 40 is placed as illustrated with a two-dot chain line in FIG. 8A and FIG. 9A. The battery storage unit 31 is an example of a water-resistant area.

As illustrated in FIG. 2 and FIG. 3, the water-resistant cover 10 has a cover main body unit 11, and the plane plate 12 joined to the inner side of the cover main body unit 11, a sealing member 13, a plurality of fitting claw parts 14, back-end claw parts 15 and front-end claw parts 16.

The cover main body unit 11 has an approximately-rectangle shape with the same width as the back-side casing 30, and forms the bottom-side surface of the back surface of the back-side casing 30 (the back surface of the mobile phone 1), In addition, the cover main body unit 11 also forms a part of the left and right sides and a part of the bottom surface of the back-side casing 30.

The plane plate 12 is a thin plate in a rectangle shape, and is joined to the inner side of the cover main body unit 11 by a double-side tape for example. On the periphery of the surface of the inner side of the plane plate 12 (the inner side of the water-resistant cover 10), the sealing member 13 is provided on the whole circumference in the circumference direction of the battery storage unit 31.

The materials of the cover main body unit 11 and the plane plate 12 are, while these are not limitation, plastic for the cover main body unit 11, and metal for the plane plate 12 in this embodiment.

Figure 7:
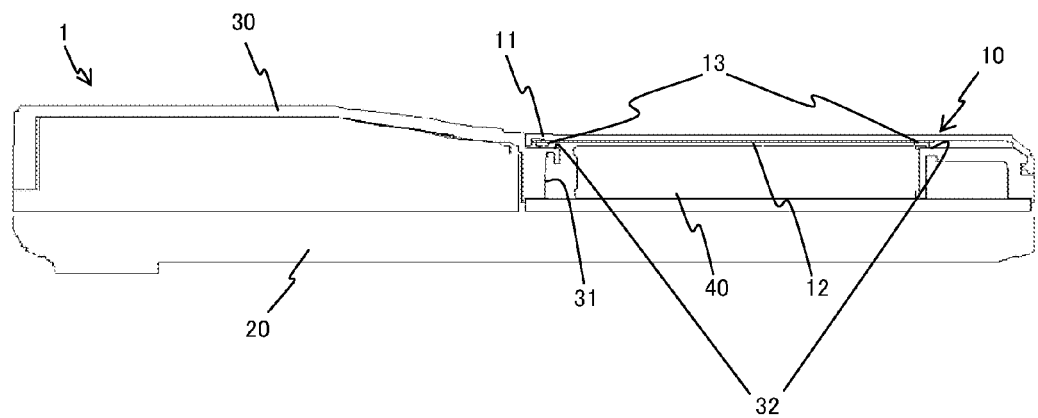
FIG. 7 is a sectional view of a part of a mobile phone to illustrate a sealing member and the like of a water-resistant cover.
Figure 8A:
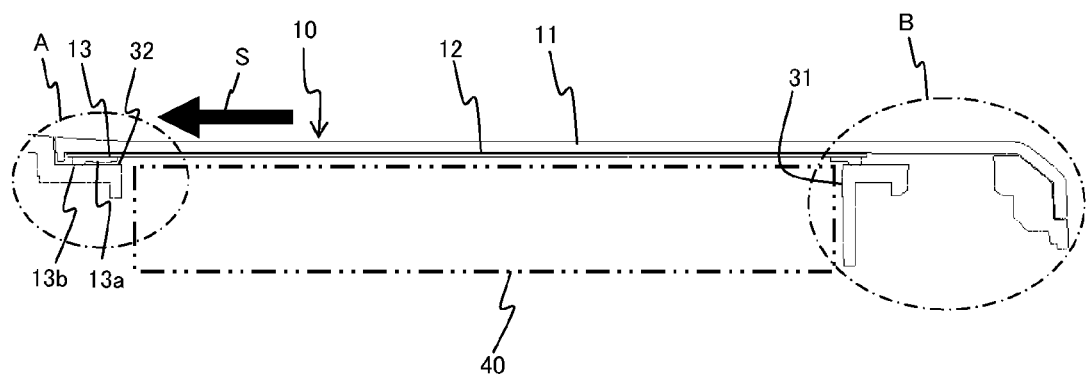
FIG. 8A is a sectional view (part 1) illustrating a water-resistant cover after sliding.

As illustrated in FIG. 7, FIG. 8A and FIG. 9A, the sealing member 13 is shaped on the plane plate 12, and is integrated with the plane plate 12.

As illustrated in FIG. 2, on the back-side casing 30, a plane part 32 is formed around the battery storage unit 31. The plane part 32 is formed on the same plane, and successively in the circumferential direction of the battery storage unit 31. The plane unit 32 is an example of a contact surface facing the sealing member 13 and formed on the same plane.

While details are to be described later, the water-resistant cover 10 is put on the mobile phone 1 with sealing member 13 sliding in the state in which it is in contact with the plane part 32 and pressed. For this reason, the plane part 32 is formed with a size that is large enough to maintain the contact with the sealing member 32 even when the sealing member 13 slides.

Figure 8D:
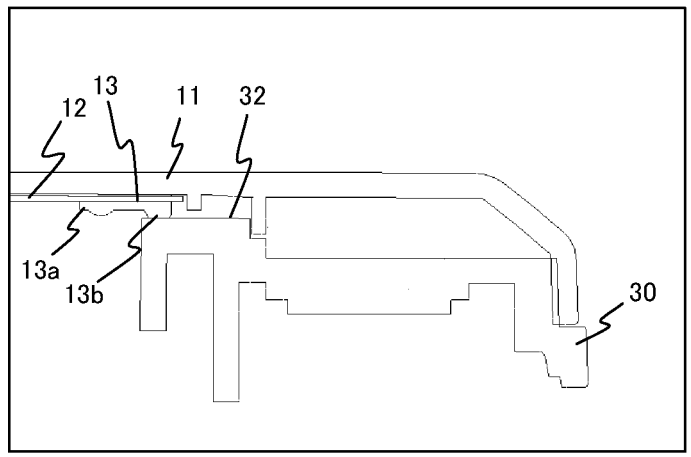
FIG. 8D is a diagram in which part B in FIG. 8A is enlarged.

As illustrated in FIG. 8C and FIG. 8D, the sealing member 13 includes a sealing base part 13a provided on the while circumference in the circumferential direction of the battery storage unit 31, and a protruded part 13b that protrudes on the whole circumference in the circumference direction of the battery storage unit 31 and contacts the plane part 32. In the protruded part 13b, the sectional shape of the section orthogonal to the circumferential direction of the battery storage unit 31 is semi-circular or semi-elliptical, and protrudes from the periphery of the sealing base unit 13a.

In the sealing member 13, low friction coating is applied at least for the protruded part 13b contacting the plane part 32. The low friction coating may be formed on the surface of the protruded part 13b and the like with a silicone-based coating agent, a fluorine-based coating agent and the like being spread on, or burned into it.

Figure 4:
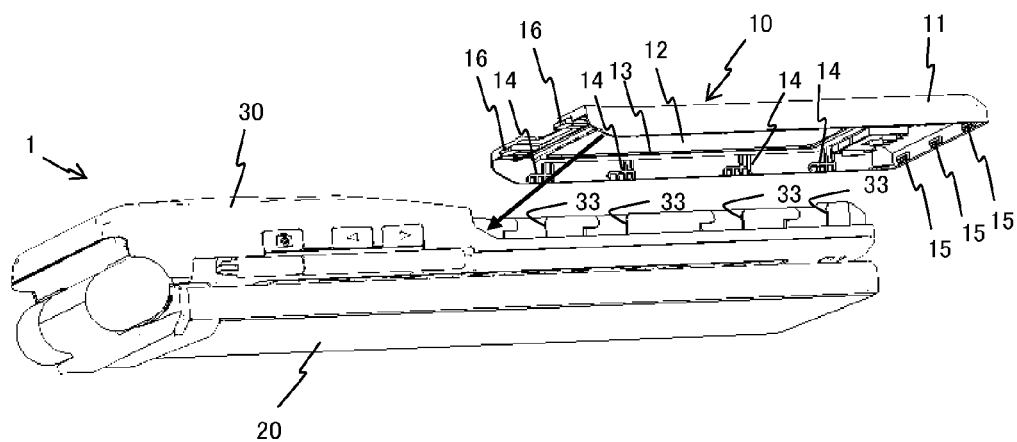
FIG. 4 is an oblique perspective view of a mobile phone to illustrate a claw part and the like of a water-resistant cover.
Figure 5:
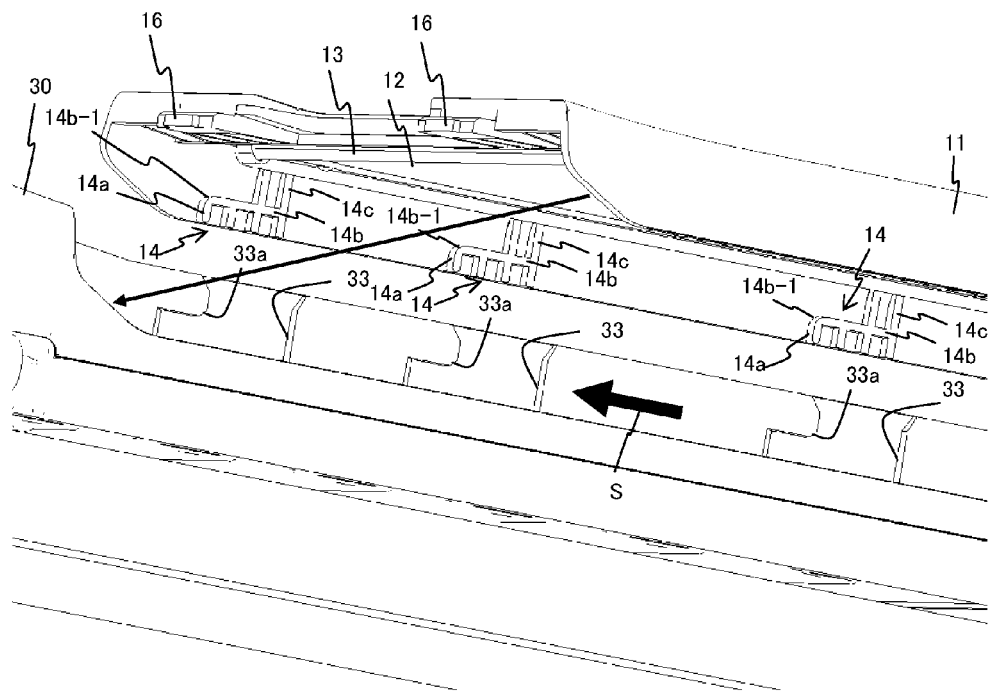
FIG. 5 is an enlarged oblique perspective view of a mobile phone to illustrate a claw part and the like of a water-resistance cover.

As illustrated in FIG. 3-FIG. 5, a total of eight fitting claw parts 14, that is, four units respectively in the inner side of the left and right side walls of the cover main body unit 11.

Against an L-shaped claw fitting slot 33 provided on the outer side of the left and right side walls of the back side casing 30, the fitting claw unit 14 is inserted in the direction crossing the sliding direction (arrow S) of the water-resistant cover 10 and fits in the claw fitting slot 33 with the water-resistant cover 10 sliding in the sliding direction (arrow S).

Meanwhile, as illustrated in FIG. 3, the fitting claw parts 14 on the left and right of the front end and the back end in the sliding direction (arrow S) are provided in the vicinity of the front end and the back end of the sliding direction (arrow S) of the sealing member 13. For this reason, the thickness in the width direction of the back side casing 30 around the battery storage unit 31 may be reduced due to the fitting claw parts 14 and the claw fitting slots 33 being positioned as described above. Accordingly, the width of the battery 40 may be increased while maintaining the width of the mobile phone 1.

The fitting claw part 14 includes a plurality of (for example, four) inserting direction teeth 14a extending in its sliding direction (arrow S), a teeth base part 14b in a linear shape connecting the plurality of inserting direction teeth 14a, and a plurality of opposite direction teeth 14c protruding from the teeth base part 14b in the opposite direction of the inserting direction.

As illustrated in FIG. 5, at the front end of the sliding direction (arrow S) of the teeth base part 14b, a bent part 14b-1 that is bent towards the inserting direction teeth 14a on the front end is formed, to make the sliding within the claw fitting slot 33. Meanwhile, in the claw fitting slot 33, a bent part 33 is also formed at the right angle part that becomes the entrance when the fitting claw part 14 slides and fits.

As illustrated in FIG. 3 and FIG. 4, for example, three back end claw part 15 are provided at the back end of the sliding direction (arrow S) of the water-resistant cover 10 so as to protrude in the sliding direction (arrow S). Meanwhile, in the back end claw part 15, a plurality of teeth extending in the inserting direction in a similar manner as the inserting direction teeth 14a are also formed.

For example, two front end claw part 16 are provided at the front end of the sliding direction (arrow S) of the water-resistant cover 10 so as to protrude in the sliding direction (arrow S).

The back end claw parts 15 and the front end claw parts 16 are inserted and fit in the back end side slots 34 and front end side slots 35 illustrated in FIG. 2.

Figure 6:
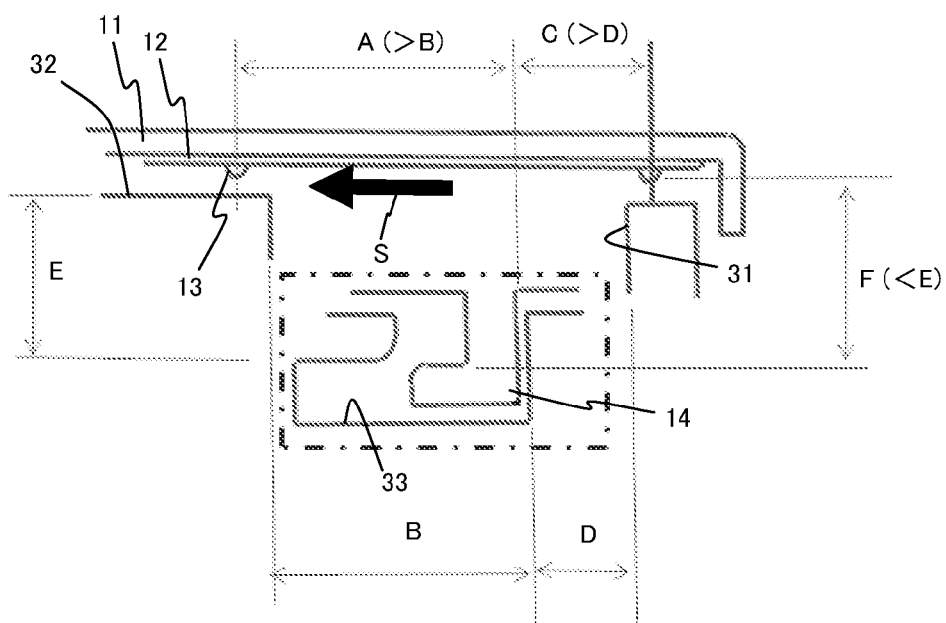
FIG. 6 is a simplified diagram to illustrate the size of a water-resistant cover.

As illustrated in FIG. 6, a distance A from the front end part of the sliding direction (arrow S) of the sealing member 13 to the back end of the fitting claw part 14 is larger than a distance B from the front end of the battery storage unit 31 to the back end of the claw fitting slot 33 that fits the fitting claw part 14.

Since the sealing member 13 is provided as described above, the front end part of the sealing member 13 can contact the plane part 32 located on the front end side of the battery storage unit 31 and pressed, before and after the sliding of the water-resistant cover 10.

Meanwhile, a distance C from the back end part of the sliding direction (arrow S) of the sealing member 13 to the back end of the fitting claw part 14 is larger than the distance D from the back end of the battery storage unit 31 to the back end of the claw fitting slot 33 that fits the fitting claw part 14.

Since the sealing member 13 is provided as described above, the back end part of the sealing member 13 can also contact the plane part 32 located on the front end side of the battery storage unit 31 and pressed, before and after the sliding of the water-resistant cover 10.

Meanwhile, the plane part 32 is formed with a size that enables the left and right parts of the sealing member 13 that extend in the sliding direction (arrow S) to be in contact with the plane part 32 and pressed before and after the sliding of the water-resistant cover 10.

A distance E from the fitting plane of the claw fitting slot 33 with the fitting claw part 14 to the plane part 32 is larger than a distance F from the fitting plane of the fitting claw part 14 with the claw fitting slot 33 to the sealing member 13.

Since the sealing member is provided as described above, in the state in which the fitting claw part 14 and the claw fitting slot 33 fit, the sealing member 13 (the protruded part 13b illustrated in FIG. 8C and FIG. 8D) contacts the plane part 32 and is pressed with pressure (the pressed protruded part 13' illustrated in FIG. 13). The sealing member 13 exercises its waterproof nature by being pressed with pressure in such a way.

When the water-resistant cover 10 slides and is put on the mobile phone 1, the fitting claw part 14 and the claw fitting slot 33 fit as illustrated in FIG. 8B, and the protruded part 13b of the sealing member 13 contacts the plane part 32 and pressed with pressure as illustrated in FIG. 8A.

In addition, before the water-resistant cover 10 slides and is put on the mobile phone 1, the fitting claw part 14 and the claw fitting slot 33 do not fit as illustrated in FIG. 9B, but the protruded part 13b of the sealing member 13 contacts the plane part 32 as illustrated in FIG. 9A.

To put on the water-resistant cover 10 on the mobile phone 1, a person inserts and slides the water-resistant cover 10 so that the fitting claw part 14 is inserted into the claw fitting slot 33 as illustrated in FIG. 9B and fits the claw fitting slot 33 as illustrated in FIG. 8B.

Figure 10B:
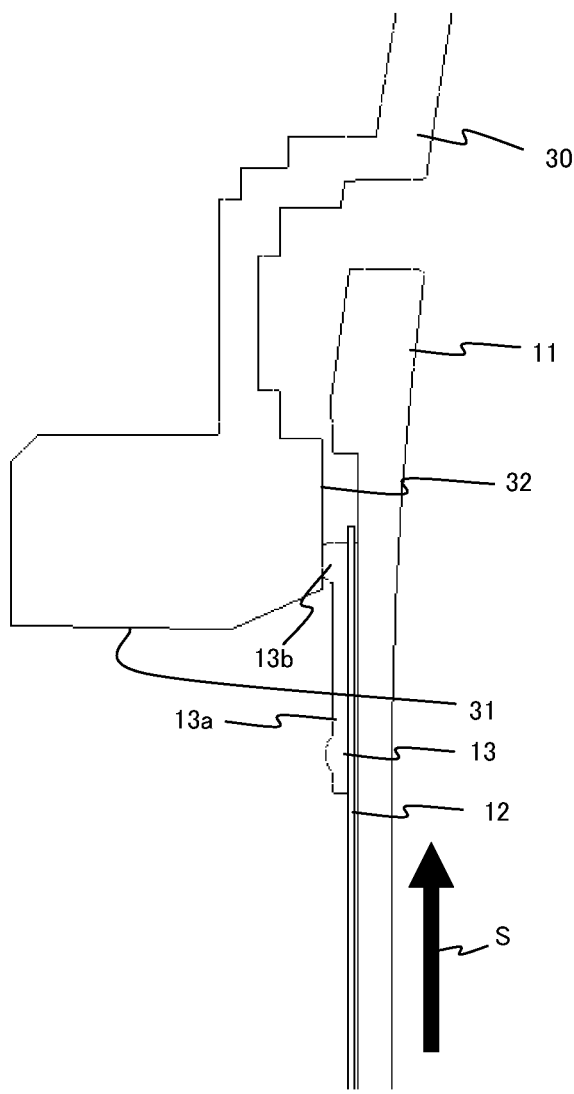
FIG. 10B is a sectional diagram illustrating a sealing member before sliding.
Figure 10C:
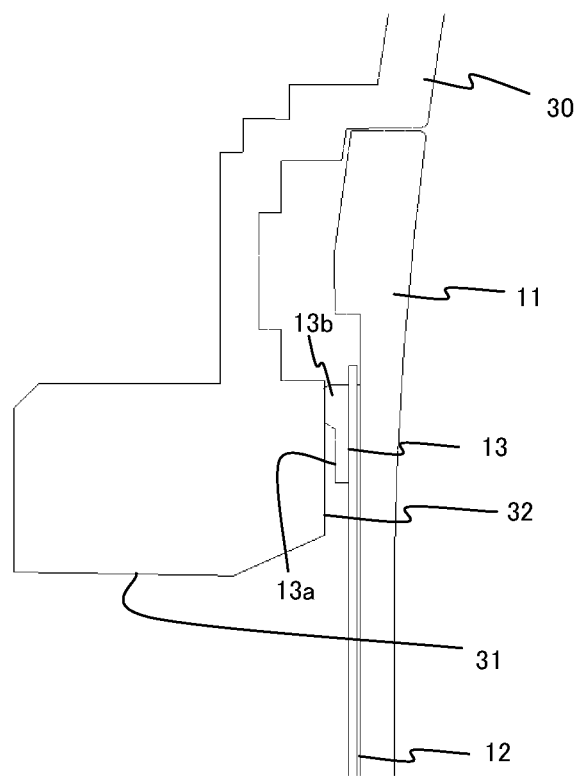
FIG. 10C is a sectional diagram illustrating a sealing member after sliding.

With the fitting claw part 14 being inserted into the claw fitting slot 33, the sealing member 13 contacts the plane part 32 as illustrated in FIG. 10B from the state before the contact with the plane part 32 illustrated in FIG. 10A and pressed with pressure. Then, the water-resistant cover 10 slides as illustrated in FIG. 10C and the fitting claw part 14 fits the claw fitting slot 33.

Figure 11:
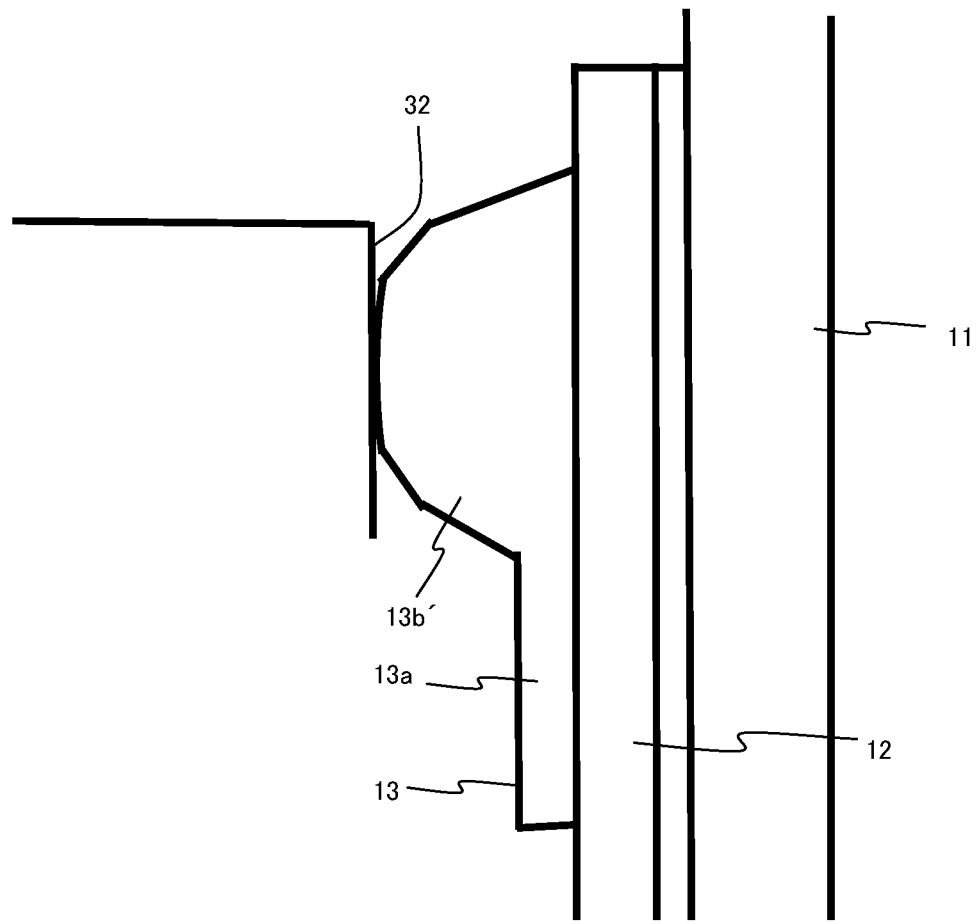
FIG. 11 is an enlarged sectional view illustrating a pressed sealing member after sliding.

From before the slide of the water-resistant cover 10 to after the slide, the sealing member 13 remains in the state in which it is pressed by the plane part 32. Furthermore, the protruded part 13b of the sealing member 13 enters the pressed state (the protruded part 13b') as illustrated in FIG. 11 by sliding and being pressed with pressure by the plane part 32. As described above, the water-resistant cover 10 slides and put on the mobile phone 1 while the sealing member 13 is in the state of being in contact with the plane part 32 and pressed with pressure.

In this embodiment explained above, for the water-resistant cover 10 and the circumference of the battery storage unit (water-resistant area) 31 of the mobile phone (electronic device) 1, the sealing member 13 is provided for the whole circumference in the circumferential direction of the battery storage unit 31 for one side. For another side, the plane part 32 facing the sealing member 13 is formed on the same plane. In addition, the water-resistant cover 10 slides and is put on the mobile phone 1 in the state in which the sealing member 13 is in contact and being pressed with pressure.

This makes it possible to avoid increase in the size in the width direction of the wall and the like of the mobile phone 1 that occurs when the sealing member 13 is pressed with pressures in the width direction of the mobile phone 1 for example. In addition, since the water-resistant cover 10 slides in the state in which the sealing member 13 is in contact with the plane part 32 on the same plane and pressed with pressure, increase in the thickness of the mobile phone 1 can also be avoided.

Therefore, according to this embodiment, the mobile phone 1 can be made smaller.

Furthermore, since the sealing member 13 can be pressed with pressure certainly be the sliding of the water-resistant cover 10, its waterproof performance and handleability at the time of attaching/removing can also be improved.

In addition, in this embodiment, the sealing member 13 contacts the plane part 32 formed on the same plane. For this reason, the sealing member 13 can be pressed with pressure evenly on the same plane, making it possible to make the mobile phone 1 smaller and to improve the waterproof performance.

In addition, in this embodiment, the sealing member 13 (or the plane part 32) is provided on the plane plate 13 joined to the inner side of the cover main body unit 11. For this reason, while in the case in which the cover main body unit 11 and the plane plate 12 are separate and are in a double-lid structure, the cover main body unit 11 and the plane plate 12 become thick as each of them has stiffness, in this embodiment, the water-resistant cover 10 can be made thin as each of them does not need to have stiffness respectively. This further makes it possible to improve design aspects and to simplify attaching/removing operations of the water-resistant cover 10. Furthermore, the cover main body unit 11 and the plane plate 12 may be made from different materials, and to make the sealing member 13 from a material that is easy to shape (for example, a material that is easy to adhere, a material that can endure the temperature at the time of shaping), for example. Furthermore, strength can be given to required parts only, for example, by giving the plane plate 12 a greater strength than that for the water-resistant cover 11.

In addition, in this embodiment, the sealing member 13 is placed on the water-resistant cover 10 and the plane part 32 is formed around the battery storage unit 11. This makes it possible to make it easier to place the sealing member 13 on the mobile phone 1, and to improve the waterproof performance.

In addition, in this embodiment, low friction coating is applied to the sealing member 13. This makes it possible to improve the waterproof performance and the handleability at the time of the water-resistant cover 10.

In addition, in this embodiment, the fitting claw part 14 fits the claw fitting slot 33 by being inserted into the L-shaped claw fitting slot 33 provided on the back side casing 30 (mobile phone 1) in the direction crossing the sliding direction of the water-resistant cover 10 and with the sliding of the water-resistant cover 10, the fitting claw part 14 includes a plurality of inserting direction teeth 14a extending in the inserting direction. In addition, the fitting claw part 14 includes the plurality of inserting direction teeth 14a, the teeth base part 14b that connects the plurality of inserting direction teeth 14a, and the plurality of opposite direction teeth 14c protruding from the teeth base part in the opposite direction. These make it possible to increase the strength of the water-resistant cover 10 with a simple configuration.

In addition, in this embodiment, the sealing member 13 is provided so that the distance E from the fitting plane of the claw fitting slot 33 with the fitting claw part 14 to the plane part 32 is larger than the distance F from the fitting plane of the fitting claw part 14 with the claw fitting slot 33 to the sealing member 13. For this reason, in the state in which the fitting claw part 14 and the claw fitting slot 33 fit, the protruded part b of the sealing member 13 contacts the plane part 32 and pressed with pressure. This makes it possible to improve the waterproof performance.

In addition, in this embodiment, the sealing member 13 includes the sealing base part 13a provided on the whole circumference in the circumference direction of the battery storage unit 31, and the protruded part 13a that protrudes on the whole circumference in the circumference direction of the battery storage unit 31 from the sealing base part 13a and contacts the plane part 32. This makes it possible to increase the strength of the sealing member 13 and to improve its waterproof performance.

In addition, in this embodiment, the shape of the section the protruded part 13b of the sealing member 13 orthogonal to the circumferential direction of the battery storage unit 31 is semi-circular or semi-elliptical. This makes it possible to improve the waterproof performance while maintaining the strength of the sealing member 13.

In addition, in this example, the battery storage unit 31 is disposed as an example of the water-resistant area. For this reason, while the capacity of the battery 40 has been increasing recently, the volume of the battery storage unit 31 can be secured by making parts of the mobile phone 1 other than the battery storage unit 31 smaller.

Meanwhile, while the mobile phone 1 has been explained in this embodiment as an example of an electronic device, a portable-type electronic device or an installation-type electronic device other than the mobile phone 1 can also be used as the electronic device.

In addition, while an example of disposing the sealing member 13 on the water-resistant cover (plane plate 12) side has been explained in this example, the sealing member may be disposed on the mobile phone (electronic device) 1 side, and the plane part (contact plane) 32 may be provided on the water-resistant cover 10 side.

In addition, while the water-resistant cover 10 slides in the state in which the sealing member 13 contacts the plane part (contact plane) 32 and pressed in this embodiment, the pressing of the sealing member 13 may start not from when the water-resistant cover 10 starts sliding but from halfway of the sliding. In addition, when sliding the water-resistant cover, while it may affect the waterproof performance negatively, the sliding may be done with a certain tilt in a direction that does not completely match the sliding direction (arrow S) in the drawing.

In addition, while the plane part 32 formed on the same plane has been described as an example of the contact plane in this embodiment, the contact plane may not necessarily be completely planar, and may be a curved surface for example.

In addition, while the battery storage unit 31 has been described as an example of the water-resistant area, the water-resistant cover 10 may be provided in a water-resistant area other than the battery storage unit 31.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A water-resistant cover placed on an electronic device in an attachable/removable manner, comprising:
a fitting claw part that is inserted into an L-shape claw fitting slot provided in the electronic device in a direction crossing a sliding direction of the water-resistant cover and that fits the claw fitting slot with sliding of the water-resistant cover, the fitting claw part being kept inserted into the claw fitting slot,
wherein for the water-resistant cover and a circumference of a water-resistant area of the electronic device, a sealing member is provided on a whole circumference in a circumferential direction of the water-resistant area on one side, and a contact plane facing the sealing member is formed on a same plane on another side,
the water-resistant cover slides and put on the electronic device in a state in which the sealing member contacts the contact plane and pressed, and
wherein the fitting claw part includes a plurality of inserting direction teeth extending in its inserting direction.

2. The water-resistant cover according to claim 1, wherein the contact plane is a plane part formed on the same plane.

3. The water-resistant cover according to claim 1, comprising:
a cover main body unit;
a plane plate joined to an inner side of the cover main body unit, wherein
the sealing member or the contact plane is formed on the plane plate.

4. The water-resistant cover according to claim 1, comprising
the sealing member, and
the contact plane is formed in a circumference of the water-resistant area of the electronic device.

5. The water-resistant cover according to claim 1, wherein low friction coating is applied to the sealing member.

6. The water-resistant cover according to claim 1, wherein the fitting claw part includes a plurality of the inserting direction teeth, a teeth base part connecting the plurality of the inserting direction teeth, and a plurality of opposite direction teeth protruding from the teeth base part in an opposite direction of the inserting direction.

7. The water-resistant cover according to claim 1, comprising
the sealing member, wherein
the contact plane is formed on a circumference of the water-resistant area of the electronic device, and
the sealing member is provided so that a distance from a fitting plane of the claw fitting slot with the fitting claw part to the contact plane becomes larger than a distance from a fitting plane of the fitting claw part with the claw fitting slot to the sealing member.

8. The water-resistant cover according to claim 1, wherein the sealing member includes a sealing base part provided on a whole circumference in a circumferential direction of the water-resistant area, and a protruded part protruding from the sealing base part on a whole circumference in a circumferential direction of the water-resistant area and contacts the contact plane.

9. The water-resistant cover according to claim 8, wherein a shape of a section of the protruded part of the sealing member orthogonal to the circumferential direction of the water-resistant area is semi-circular or semi-elliptical.

10. The water-resistant cover according to claim 1, wherein the water-resistant area is a battery storage unit.

11. An electronic device comprising:
a water-resistant cover placed on the electronic device in an attachable/removable manner;
a water-resistant area; and
a fitting claw part that is inserted into an L-shape claw fitting slot provided in the electronic device in a direction crossing a sliding direction of the water-resistant cover and that fits the claw fitting slot with sliding of the water-resistant cover, the fitting claw part being kept inserted into the claw fitting slot,
wherein for the water-resistant cover and a circumference of a water-resistant area of the electronic device, a sealing member is provided on a whole circumference in a circumferential direction of the water-resistant area on one side, and a contact plane facing the sealing member is formed on a same plane on another side,
the water-resistant cover slides and put on the electronic device in a state in which the sealing member contacts the contact plane and pressed, and
wherein the fitting claw part includes a plurality of inserting direction teeth extending in its inserting direction.

* * * * *